US010676604B2

(12) United States Patent
Reichelt et al.

(10) Patent No.: US 10,676,604 B2
(45) Date of Patent: Jun. 9, 2020

(54) LONG-BRANCHED POLYPROPYLENE COMPOSITION WITH INCREASED MELT STRENGTH STABILITY

(71) Applicant: BOREALIS AG, Vienna (AT)

(72) Inventors: Norbert Reichelt, Neuhofen/Krems (AT); Paul De Mink, Freistadt (AT); Markus Gahleitner, Neuhofen/Krems (AT); Katja Klimke, Abu Dhabi (AE); Dietrich Gloger, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/767,330

(22) PCT Filed: Oct. 21, 2016

(86) PCT No.: PCT/EP2016/075338
§ 371 (c)(1),
(2) Date: Apr. 10, 2018

(87) PCT Pub. No.: WO2017/068106
PCT Pub. Date: Apr. 27, 2017

(65) Prior Publication Data
US 2018/0298174 A1 Oct. 18, 2018

(30) Foreign Application Priority Data
Oct. 21, 2015 (EP) .................................... 15190777

(51) Int. Cl.
C08L 23/12 (2006.01)
C08F 299/00 (2006.01)

(52) U.S. Cl.
CPC ............ C08L 23/12 (2013.01); C08F 299/00 (2013.01); C08L 2203/14 (2013.01); C08L 2205/025 (2013.01); C08L 2207/02 (2013.01); C08L 2207/07 (2013.01); C08L 2207/20 (2013.01)

(58) Field of Classification Search
CPC ..... C08L 23/12; C08L 23/14; C08L 2205/025
See application file for complete search history.

(56) References Cited

U.S. PATENT DOCUMENTS

| 4,382,019 | A | 5/1983 | Greco |
| 4,473,600 | A | 9/1984 | Andrew |
| 4,560,671 | A | 12/1985 | Gross et al. |
| 4,657,882 | A | 4/1987 | Karayannis et al. |
| 5,539,067 | A | 7/1996 | Parodi et al. |
| 5,618,771 | A | 4/1997 | Parodi et al. |
| 2005/0154136 | A1 | 7/2005 | Dharia et al. |

FOREIGN PATENT DOCUMENTS

| CN | 103547443 A | 1/2014 |
| CN | 104508036 A1 | 4/2015 |
| CN | 104718249 | 6/2015 |
| EP | 0045977 A2 | 2/1982 |
| EP | 0045975 A2 | 3/1982 |
| EP | 0045976 A2 | 3/1982 |
| EP | 2386601 A1 | 11/2011 |
| EP | 2610271 A1 | 7/2013 |
| JP | H06192460 A | 7/1994 |
| JP | 2006181957 A | 7/2006 |
| JP | 2009275149 A | 11/2009 |
| JP | 2011051180 A | 3/2011 |
| WO | 1987/07620 A1 | 12/1987 |
| WO | 1992/19653 A1 | 11/1992 |
| WO | 1992/19659 A1 | 11/1992 |
| WO | 1992/21705 A1 | 12/1992 |
| WO | 1993/11165 A1 | 6/1993 |
| WO | 93/19100 A1 | 9/1993 |
| WO | 1997/36939 A1 | 10/1997 |
| WO | 1998/12234 A1 | 3/1998 |
| WO | 1999/33842 A1 | 7/1999 |
| WO | 2003/000754 A1 | 1/2003 |
| WO | 2003/000755 A2 | 1/2003 |
| WO | 2003/000756 A1 | 1/2003 |
| WO | 2003/000757 A1 | 1/2003 |
| WO | 2004/029112 A1 | 4/2004 |
| WO | 2012/007430 A1 | 1/2012 |
| WO | 2012/150019 A1 | 11/2012 |
| WO | 2014/016205 A1 | 1/2014 |
| WO | 2014/016206 A1 | 1/2014 |
| WO | WO 2014/016206 | * 1/2014 |

OTHER PUBLICATIONS

Japanese Office action for Application No. 2018-515245, dated Mar. 19, 2019.
Zhou et al., "A new decoupling method for accurate quantification of polyethylene copolymer composition and triad sequence distribution with 13C NMR", Journal of Magnetic Resonance 187 (2007) pp. 225-233.
Wang et al., "Structural Analysis of Ethylene/Propylene Copolymers Synthesized with a Constrained Geometry Catalyst", Macromolecules 2000, 33, pp. 1157-1162.
Singh et al., "Triad sequence determination of ethylene-propylene copolymers—application of quantitative 13C NMR", Polymer Testing 28 (2009) pp. 475-479.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
Kakugo et al., "13C NMR Determination of Monomer Sequence Distribution in Ethylene-Propylene Copolymers Prepared with d-TiCl3-Al(C2H5)2Cl" Macromolecules 1982, 15, pp. 1150-1152.
Resconi et al., "Selectivity in Propene Polymerization with Metallocene Catalysts", Chem. Rev. 2000, 100, pp. 1253-1345.
Office action for Chinese Patent Application No. 20200220007173 20, dated Feb. 25, 2020.

* cited by examiner

Primary Examiner — Jeffrey C Mullis
(74) Attorney, Agent, or Firm — Tarolli, Sundheim, Covell & Tummino LLP

(57) ABSTRACT

The invention relates to long-chain branched polypropylene composition (b-PPC) comprising at least one long-chain branched propylene homopolymer or copolymer (b-PP) and at least one linear propylene homopolymer or copolymer (l-PP). The long-chain branched polypropylene composition (b-PPC) being suitable for foam application.

10 Claims, No Drawings

LONG-BRANCHED POLYPROPYLENE COMPOSITION WITH INCREASED MELT STRENGTH STABILITY

The present invention relates to a long-chain branched polypropylene composition (b-PPC) comprising at least one long-chain branched propylene homopolymer or copolymer (b-PP) and at least one linear propylene homopolymer or copolymer (l-PP). The invention further relates to a process for the production of the long-chain branched polypropylene composition (b-PPC). The invention also relates to an article made from the long-chain branched polypropylene composition (b-PPC) and to a process for producing an article comprising the long-chain branched polypropylene composition (b-PPC).

Propylene homopolymers and copolymers are suitable for many applications such as packaging, textile, automotive, laboratory equipment and pipe. These polymers present a variety of properties such as for example high modulus, tensile strength, rigidity and heat resistance. These properties make polypropylenes very attractive materials in numerous applications such as for example foam.

Thermoplastic foams generally possess a cellular structure generated by the expansion of a blowing agent. The cellular structure provides unique properties which enable the foamed plastics to be used for various industrial, infrastructure and packaging applications. Due to the above mentioned advantageous properties of polypropylene, foam made of polypropylene has been considered as a substitute for other thermoplastic foams, such as for example polyethylene and polystyrene. However, it is also known that polypropylene materials exhibit some disadvantages during thermoplastic processing, limiting their use for the preparation of foams. In particular, many polypropylenes have low melt strength and/or low melt extensibility. Foam applications require high melt strength and at the same time good flow properties. Therefore it is necessary to improve these properties of polypropylene.

This objective can be reached by subjecting the polypropylene to a post-reactor modification process such as for example a high melt strength (HMS) process. This process generates branching in the polypropylene materials resulting in long-chain branched polypropylenes. The long-chain branching is generally associated with improved melt-strength. These long-chain branched polypropylenes are therefore often used for making foams.

A challenge within the field of existing long-chain branched polypropylenes is their sensitivity to shear and elongation during processing (shear modification) resulting in a loss of melt strength properties. This shear modification is also known from other long-chain branched polymers like for example, low-density polyethylene (LDPE) from high-pressure processes (see e.g. Rokudai, J. Appl. Polym. Sci. 23, 1979, 463-471), but no suitable way to overcome said sensitivity has been presented so far in the literature. These long-chain branched polypropylenes are generally used for the preparation of long-chain branched polypropylene compositions and articles comprising such compositions. Thus, the sensitivity problem of long-chain branched polypropylenes during the production of long-chain branched polypropylene compositions results in a loss of melt strength properties affecting the quality and the reproducibility properties of such long-chain branched polypropylene compositions and articles comprising such compositions. On the other hand, the sensitivity to shear and elongation during processing of long-chain branched polypropylenes limits the possibilities of the resulting long-chain branched polypropylene compositions to be further processed and prevents the possible recyclability of such compositions.

Thus there is a wish to improve long-chain branched polypropylene compositions with respect to their sensitivity to shear and elongation during processing.

EP2386601 (in the name of BOREALIS AG) describes a polypropylene composition comprising (A) 70 to 95 wt %, based on the total weight of the polypropylene composition, of a high melt strength long-chain branched polypropylene and (B) 5 wt % to 30 wt %, based on the total weight of the polypropylene composition, of a low molecular weight linear isotactic polypropylene component having an $MFR_2$ in a range of 500 to 5000 g/10 min measured according to ISO 1133 (230° C., 2.16 kg load). The described polypropylene composition is limited to a low molecular weight linear isotactic polypropylene component as component (B). Additionally the composition is used for the production of injection moulded articles.

Therefore there still exists a need for long-chain branched polypropylene compositions capable of withstanding shear and elongation during processing or during further processing and keeping good melt strength properties.

INVENTION

The above mentioned disadvantages have now been overcome by providing a long-chain branched polypropylene composition (b-PPC) comprising:
a) at least one long-chain branched propylene homopolymer or copolymer (b-PP) having:
  i. a melt flow rate $MFR_2$ in the range of 1.5 to 3.5 g/10 min as measured at 230° C. under a load of 2.16 kg according to ISO 1133 and
  ii. a F30 melt strength in the range of 10.0 to 40.0 cN as measured at a die pressure of 30 bar according to ISO 16790:2005,
b) at least one linear propylene homopolymer or copolymer (l-PP) having:
  i. a melt flow rate $MFR_2$ of ≤1.5 g/10 min as measured at 230° C. under a load of 2.16 kg according to ISO 1133 and
  ii. a F30 melt strength >40.0 cN as measured at a die pressure of 30 bar according to ISO 16790:2005
wherein the long-chain branched polypropylene composition (b-PPC) has a F30 melt strength of ≥10.0 cN as measured at a die pressure of 30 bar according to ISO 16790:2005 and wherein the long-chain branched polypropylene composition (b-PPC) comprises 10.0 to 50.0 wt % of the at least one linear propylene homopolymer or copolymer (l-PP), relative to the total amount of long-chain branched polypropylene composition (b-PPC).

The long-chain branched polypropylene composition according to the present invention is capable of withstanding shear and elongation during processing and is also capable of keeping good melt strength properties after been processed.

An additional advantage of the long-chain branched polypropylene composition according to the present invention is that such composition keeps good melt strength properties even after more than one processing step. This enables the direct reuse of recyclates created during the long-chain branched polypropylene composition preparation and also during the production of articles made of such long-chain branched polypropylene composition. It also enables the recycling of post-consumer articles and ready-made articles made from such long-chain branched polypropylene composition.

DESCRIPTION OF THE INVENTION

The present invention provides a long-chain branched polypropylene composition (b-PPC) comprising:
a) at least one long-chain branched propylene homopolymer or copolymer (b-PP) having:
  i. a melt flow rate $MFR_2$ in the range of 1.5 to 3.5 g/10 min as measured at 230° C. under a load of 2.16 kg according to ISO 1133 and
  ii. a F30 melt strength in the range of 10.0 to 40.0 cN as measured at a die pressure of 30 bar according to ISO 16790:2005,
b) at least one linear propylene homopolymer or copolymer (l-PP) having:
  i. a melt flow rate $MFR_2$ of ≤1.5 g/10 min as measured at 230° C. under a load of 2.16 kg according to ISO 1133 and
  ii. a F30 melt strength >40.0 cN as measured at a die pressure of 30 bar according to ISO 16790:2005
wherein the long-chain branched polypropylene composition (b-PPC) has a F30 melt strength of ≥10.0 cN as measured at a die pressure of 30 bar according to ISO 16790:2005 and wherein the long-chain branched polypropylene composition (b-PPC) comprises 10.0 to 50.0 wt % of the at least one linear propylene homopolymer or copolymer (l-PP), relative to the total amount of long-chain branched polypropylene composition (b-PPC).

According to the present invention the expression "propylene homopolymer" relates to a polypropylene that consists substantially, i.e. of at least 99.0 wt %, more preferably of at least 99.5 wt %, still more preferably of at least 99.8 wt %, like at least 99.9 wt % of propylene units. In another embodiment only propylene units are detectable, i.e. only propylene has been polymerized.

According to the present invention the expression "propylene copolymer" relates to a copolymer comprising units derived from propylene and at least one comonomer selected from ethylene and $C_4$-$C_{20}$ alpha-olefins, preferably ethylene or at least a $C_4$-$C_{12}$ alpha-olefin. Accordingly the propylene copolymer comprises units derived from propylene and at least one linear or branched comonomer selected from the group consisting of ethylene, $C_4$ alpha-olefin, $C_5$ alpha-olefin, $C_6$ alpha-olefin, $C_7$ alpha-olefin, $C_8$ alpha-olefin, $C_9$ alpha-olefin and $C_{10}$ alpha-olefin. More preferably the propylene copolymer comprises units derived from propylene and at least one comonomer selected from ethylene or linear $C_4$-$C_{10}$ alpha-olefin, more preferably selected from ethylene, 1-butene, 1-pentene, 1-hexene, 1-heptene, 1-octene, 1-nonene and 1-decene, wherein ethylene, 1-butene and 1-hexene are most preferred. It is particularly preferred that the propylene copolymer consists of units derived from propylene and ethylene.

The linear propylene copolymer (l-PP) generally has an amount of units derived from ethylene, $C_4$-$C_{20}$ alpha olefin and any combination thereof, in the range of 2.0 to 35.0 wt %, preferably in the range of 3.5 to 30.0 wt %, more preferably in the range of 5.0 to 25.0 wt %. A suitable lower limit is 2.0 wt %, preferably 3.5 wt %, more preferably 5.0 wt %. A suitable upper limit is 35.0 wt %, preferably 30.0 wt %, more preferably 25.0 wt %. The lower and upper indicated values of the ranges are included. In case more than one type of comonomer is used the above indicated amounts relate to the total of all comonomers used.

Generally the linear propylene homopolymer or copolymer (l-PP) according to the present invention has a weight average molecular weight (Mw) of at least 750 kg/mol. Preferably, the linear propylene homopolymer or copolymer (l-PP) has a weight average molecular weight (Mw) in the range of 750 to 2000 kg/mol, more preferably in the range of 800 to 1500 kg/mol.

Generally the melt flow rate ($MFR_2$) for the linear propylene homopolymer or copolymer (l-PP) is of ≤1.5 g/10 min. The $MFR_2$ for the linear propylene homopolymer or copolymer (l-PP) is determined according to ISO 1133, at a temperature of 230° C. and under a load of 2.16 kg. Irrespective of the exact nature of the linear propylene homopolymer or copolymer (l-PP) it is preferred that the $MFR_2$ is between 0.1 and 1.5 g/10 min, more preferably the $MFR_2$ is between 0.2 and 1.2 g/10 min. A suitable lower limit is 0.1 g/10 min, preferably 0.2 g/10 min. A suitable upper limit is 1.5 g/10 min, preferably 1.2 g/10 min. The lower and upper indicated values of the ranges are included.

The F30 melt strength of the linear propylene homopolymer or copolymer (l-PP) is measured according to ISO 16790:2005 at a die pressure of 30 bar and is generally >40.0 cN, preferably in the range of 41.0 to 100.0 cN, more preferably in the range of 45.0 to 90.0 cN. A suitable lower limit is 41.0 cN, preferably 45.0 cN. A suitable upper limit is 100.0 cN, preferably 90.0 cN. The lower and upper indicated values of the F30 melt strength ranges are included.

The linear propylene homopolymer or copolymer (l-PP) generally has a v30 melt extensibility, measured according to ISO 16790:2005, of less than 200 mm/s, preferably in the range of 50 to 180 mm/s, more preferably in the range of 80 to 170 mm/s, even more preferably in the range of 90 to 160 mm/s.

The linear propylene homopolymer or copolymer (l-PP) for use in the preparation of the long-chain branched polypropylene composition (b-PPC) according to the invention is generally produced in a polymerisation processes and under conditions well-known to the man skilled in the art of making propylene polymers. The linear propylene homopolymer or copolymer (l-PP) is generally produced by respectively polymerising propylene or by copolymerising propylene with the comonomers in the amounts previously described.

In case the linear propylene homopolymer or copolymer (l-PP) is a copolymer it is preferred that it is a heterophasic copolymer. Such polymers result from a polymerisation process involving two or more stages and comprise at least a homopolymer matrix phase and a dispersed elastomer phase, in case of ethylene as comonomer an ethylene-propylene rubber (EPR). Thus the matrix contains (finely) dispersed inclusions being not part of the matrix and said inclusions contain the elastomeric propylene copolymer (EPR). The term "inclusion" according to this invention shall preferably indicate that the matrix and the inclusion form different phases within the heterophasic propylene copolymer (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures. Generally the amount of dispersed elastomer phase in such a heterophasic copolymer is in the range of 5.0 to 30.0 wt %, preferably in the range of 8.0 to 25.0 wt %, more preferably in the range of 10.0 to 22.0 wt %.

Generally a polymerisation catalyst will be present in the polymerisation process for producing the linear propylene homopolymer or copolymer (l-PP). The polymerisation catalyst typically comprises a transition metal compound and an activator. A suitable polymerisation catalyst known in the art is generally a Ziegler-Natta catalyst.

A Ziegler-Natta type catalyst typically used for propylene polymerisation and/or copolymerisation will be a stereospecific, solid, high yield Ziegler-Natta catalyst component comprising as main components Mg, Ti and Cl. In addition to the solid catalyst component, a cocatalyst(s) as well as external donor(s) will generally be used in the polymerisation process.

The components of the catalyst may be supported on a particulate support, such as inorganic oxide, like silica or alumina, or, usually, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

The solid catalyst usually also comprises at least one electron donor (internal electron donor) and optionally aluminium.

Suitable external electron donors used in the polymerisation are well known in the art and include ethers, ketones, amines, alcohols, phenols, phosphines and silanes.

Examples of suitable Ziegler-Natta catalysts and components in the catalysts are described among others in WO87/07620, WO92/21705, WO93/11165, WO93/11166, WO93/19100, WO97/36939, WO98/12234, WO99/33842, WO03/000756, WO03/000757, WO03/000754, WO03/000755, WO2004/029112, EP2610271, WO2012/007430, WO92/19659, WO92/19653, WO92/19658, U.S. Pat. Nos. 4,382,019, 4,435,550, 4,465,782, 4,473,660, 4,560,671, 5,539,067, 5,618,771, EP45975, EP45976, EP45977, WO95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

The process for polymerising propylene or copolymerising propylene with the comonomers previously described is known in the state of the art. Such a polymerisation process generally comprises at least one polymerisation stage however the polymerisation process may also comprise additional polymerisation stages. The polymerisation at each stage is generally carried out in solution, slurry, bulk or gas phase. In one particular embodiment the process contains at least one bulk reactor stage and at least one gas phase reactor stage, each stage comprising at least one reactor and all reactors being arranged in cascade. In one particularly preferred embodiment the polymerisation process comprises at least one bulk reactor and at least one gas phase reactor arranged in that order. In some preferred processes the process comprises one bulk reactor and at least two gas phase reactors, e.g. two or three gas phase reactors. The process may further comprise pre- and post reactors. Pre-reactors comprise typically prepolymerisation reactors. In this kind of processes high polymerisation temperatures are generally used in order to achieve specific properties of the polymers. Typical temperatures in all processes are 70° C. or higher, preferably 80° C. or higher, more preferably 85° C. or higher. The high polymerisation temperatures as mentioned above are generally applied either in some or all reactors of the reactor cascade.

As mentioned above the long-chain branched polypropylene composition (b-PPC) according to the present invention also comprises at least one long-chain branched propylene homopolymer or copolymer (b-PP).

The melt flow rate ($MFR_2$) of the long-chain branched propylene homopolymer or copolymer (b-PP) according to the present invention is generally in the range of 1.5 to 3.5 g/10 min. Preferably, the $MFR_2$ for said long-chain branched propylene homopolymer or copolymer (b-PP) is in the range of 1.9 to 3.0 g/10 min, more preferably in the range of 2.0 to 2.5 g/10 min. The $MFR_2$ of the long-chain branched propylene homopolymer or copolymer (b-PP) is determined according to ISO standard 1133, at a temperature of 230° C. and under a load of 2.16 kg. A suitable lower limit is 1.5 g/10 min, preferably 1.9 g/10 min, more preferably 2.0 g/10 min. A suitable upper limit is 3.5 g/10 min, preferably 3.0 g/10 min, more preferably 2.5 g/10 min. The lower and upper indicated values of the $MFR_2$ ranges are included.

The F30 melt strength of the long-chain branched propylene homopolymer or copolymer (b-PP) is measured according to ISO 16790:2005 at a die pressure of 30 bar and is generally in the range of 10.0 to 40.0 cN, preferably in the range of 12.0 to 38.0 cN, more preferably in the range of 14.0 to 36.0 cN. A suitable lower limit is 10.0 cN, preferably 12.0 cN, more preferably 14.0 cN. A suitable upper limit is 40.0 cN, preferably 38.0 cN more preferably 36.0 cN. The lower and upper indicated values of the F30 melt strength ranges are included.

The long-chain branched propylene homopolymer or copolymer (b-PP) according to the present invention generally has a v30 melt extensibility measured according to ISO 16790:2005 at a die pressure of 30 bar, of ≥180 mm/s, preferably in the range of 180 to 500 mm/s, more preferably in the range of 200 to 400 mm/s, even more preferably in the range of 220 to 350 mm/s. A suitable lower limit is 180 mm/s, preferably 200 mm/s, more preferably 220 mm/s. A suitable upper limit is 500 mm/s, preferably 400 mm/s, more preferably 350 mm/s. The lower and upper indicated values of the v30 melt extensibility ranges are included.

The long-chain branched propylene copolymer (b-PP) generally has a comonomer selected from ethylene, $C_4$-$C_{20}$-alpha olefin and any combination thereof and a comonomer content in the range of 0.5 to 8.0 wt %, preferably in the range of 0.8 to 6.5 wt %, more preferably in the range of 1.0 to 5.0 wt %. A suitable lower limit is 0.5 wt %, preferably 0.8 wt %, more preferably 1.0 wt %. A suitable upper limit is 8.0 wt %, preferably 6.5 wt %, more preferably 5.0 wt %. The lower and upper indicated values of the ranges are included. In case more than one type of comonomer is used the above indicated amounts relate to the total of all comonomers used. It is further preferred that the long-chain branched propylene copolymer (b-PP) is a random copolymer having a single-phase structure without any elastomeric inclusions.

The long-chain branched propylene homopolymer or copolymer (b-PP) according to the present invention is generally produced for instance using any suitable process as known in the art, e.g. by a reaction of a propylene polymer with a thermally decomposing free radical-forming agent and/or by a treatment of a propylene polymer with ionizing radiation, where both cases may optionally be accompanied or followed by a reaction with a functionally unsaturated compound.

The term "propylene polymer" relates to a propylene homopolymer or to a propylene copolymer as described before. The term "propylene polymer" can also relate to a mixture of the above described propylene homopolymer and propylene copolymer.

The propylene homopolymer and the propylene copolymer related to the term "propylene polymer" are generally produced in a polymerisation processes and under conditions as described before.

The propylene polymer generally has, in the propylene copolymer, an amount of units derived from ethylene and/or $C_4$-$C_{20}$ alpha-olefins in the range of 0.5 to 8.0 wt %, preferably in the range of 0.8 to 6.5 wt %, more preferably in the range of 1.0 to 5.0 wt %. A suitable lower limit is 0.5 wt %, preferably 0.8 wt %, more preferably 1.0 wt %. A suitable upper limit is 8.0 wt %, preferably 6.5 wt %, more preferably 5.0 wt %. The lower and upper indicated values of the ranges are included. In case more than one type of comonomer is used the above indicated amounts relate to the total of all comonomers used.

Further processes known in the art are also suitable for the production of the long-chain branched propylene homopolymer or copolymer (b-PP), provided that the resulting long-chain branched propylene homopolymer or copolymer (b-PP) meets the characteristics as required regarding the F30 melt strength value and preferably also the v30 melt extensibility value according to the present invention. For example, the long-chain branched propylene homopolymer or copolymer (b-PP) according to the present invention can be produced by polymerisation process using metallocene catalyst.

A preferred process for the production of the long-chain branched propylene homopolymer or copolymer (b-PP) is such a process where the propylene polymer is reacted with a thermally decomposing free radical-forming agent and optionally with a functionally unsaturated compound chosen from:
 a) at least one bifunctionally unsaturated monomer and/or polymer
 or
 b) at least one multifunctionally unsaturated monomer and/or polymer
 or
 c) a mixture of (a) and (b).

Generally peroxides are used as thermally decomposing free radical-forming agents. Preferably the thermally decomposing free radical-forming agent is selected from the group comprising acyl peroxide, alkyl peroxide, hydroperoxide, perester, peroxycarbonate and mixtures of any of them. The following listed peroxides are particularly preferred:
 a) acyl peroxides (ACPER): benzoyl peroxide, 4-chlorobenzoyl peroxide, 3-methoxybenzoyl peroxide and/or methyl benzoyl peroxide.
 b) alkyl peroxides (ALPER): allyl t-butyl peroxide, 2,2-bis(t-butylperoxybutane), 1,1-bis(t-butylperoxy)-3,3,5-trimethylcyclohexane, n-butyl-4,4-bis(t-butylperoxy)valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.
 c) peresters and peroxy carbonates (PER): butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed thermally decomposing free radical-forming agents. So for example the following combinations are possible:
 i) ACPER and ALPER
 ii) ACPER and PER
 iii) ALPER and PER
 iv) ACPER and ALPER and PER The man skilled in the art knows how to choose the appropriate thermally decomposing free radical-forming agent that will thermally decompose during the preferred process for the production of the long-chain branched propylene homopolymer or copolymer (b-PP) according to the present invention. For example the man skilled in the art will consider the decomposition temperature of the thermally decomposing free radical-forming agent with respect to the temperature used in the preferred process for the production of the long-chain branched propylene homopolymer or copolymer (b-PP).

In the preferred process for the production of the long-chain branched propylene homopolymer or copolymer (b-PP), the propylene polymer is generally mixed with 0.25 to 1.00 parts per weight (ppw) of thermally decomposing free radical-forming agent per 100 parts per weight of propylene polymer.

"Bifunctionally unsaturated or multifunctionally unsaturated" as used above means the presence of respectively two or more non-aromatic double bonds. Generally, only those bifunctionally or multifunctionally unsaturated compounds are used which can be polymerized with the aid of free radicals. Preferably the bifunctionally unsaturated monomers are chosen from:
 divinyl compounds, such as for example divinylaniline, m-divinylbenzene, p-divinylbenzene, divinylpentane and divinylpropane;
 allyl compounds, such as for example allyl acrylate, allyl methacrylate, allyl methyl maleate and allyl vinyl ether;
 dienes, such as for example 1,3-butadiene, chloroprene, cyclohexadiene, cyclopentadiene, 2,3-dimethylbutadiene, heptadiene, hexadiene, isoprene and 1,4-pentadiene;
 aromatic and/or aliphatic bis (maleimide) bis (citraconimide);
 and mixtures of any of these unsaturated monomers.

Especially preferred bifunctionally unsaturated monomers are 1,3-butadiene, isoprene, dimethyl butadiene and divinylbenzene. The bifunctionally unsaturated polymers are preferably polymers comprising at least one of the above mentioned bifunctionally unsaturated monomers. The multifunctionally unsaturated polymer contains more than one unsaturated monomer as described above. Examples of such polymers including oligomers are polybutadienes, especially where the different microstructures in the polymer chain, i.e. 1,4-cis, 1,4-trans and 1,2-(vinyl) are predominantly in the 1,2-(vinyl) configuration, copolymers of butadiene and styrene having the 1,2-(vinyl) configuration in the polymer chain.

A preferred polymer is polybutadiene, in particular a polybutadiene having more than 50.0 wt % of the butadiene in the 1,2-(vinyl) configuration. The 1,2-(vinyl) configuration is determined by $^1$H and $^{13}$C NMR spectroscopy.

In the preferred process for the production of the long-chain branched propylene homopolymer or copolymer (b-PP), optionally at least one functionally unsaturated compound is used next to the thermally decomposing free radical-forming agent. Usually not more than three different functionally unsaturated compounds are used; preferably one functionally unsaturated compound is used.

In the preferred process for the production of the long-chain branched propylene homopolymer or copolymer (b-PP) the optionally at least one functionally unsaturated compound can be used in a concentration of 0.4 to 2.5 parts per weight (ppw) of optionally at least one functionally unsaturated compound per 100 parts per weight of propylene polymer.

A more preferred process for the production of the long-chain branched propylene homopolymer or copolymer (b-PP) is such a process comprising the steps: mixing the propylene polymer with a thermally decomposing free radical-forming agent and optionally with at least one functionally unsaturated compound at a temperature of 20 to 100° C. for at least 2 minutes to form a pre-mixed material and melt mixing the pre-mixed material in a melt mixing device at a barrel temperature in the range of 180 to 300° C.

It should be understood that when at least one thermally decomposing free radical-forming agent and optionally at least one functionally unsaturated compound are used, the addition of the at least one thermally decomposing free radical-forming agent and the optionally at least one functionally unsaturated compound may be achieved in various manners, known by the man skilled in the art, for example: at once in a mixing step or split up in two additions: a first addition in a mixing step and a second addition in a melt-mixing step. Complete addition of the at least one thermally decomposing free radical-forming agent and the optionally at least one functionally unsaturated compound in a mixing step is preferred.

The optionally at least one functionally unsaturated compound is optionally added to and mixed with the propylene polymer and the at least one thermally decomposing free radical-forming agent in the form of a masterbatch composition during the process for the production of the long-chain branched propylene homopolymer or copolymer (b-PP).

The mixing step of the propylene polymer with at least one thermally decomposing free radical-forming agent and optionally with at least one functionally unsaturated compound to form a pre-mixed material is generally carried out in a powder mixing device, like a horizontal mixer with paddle stirrer. The mixing step is generally carried out at a temperature range of 20 to 100° C., preferably at a temperature range of 30 to 90° C., more preferably at a temperature range of 40 to 80° C. The residence time of the propylene polymer in the mixing step is usually at least 2 minutes, preferably in the range of 5 to 30 minutes, more preferably in the range of 8 to 20 minutes. Following the mixing step, the pre-mixed material is then melt mixed at a barrel temperature in the range of 180 to 300° C., which is not necessarily constant over the complete melt-mixing step.

The barrel temperature is preferably in the range of 200 to 280° C. The pre-mixed material is preferably melt-mixed in a continuous melt mixing device like for example a single screw extruder, a co-rotating twin screw extruder or a co-rotating kneader. Preferably, the melt mixing device includes a feed zone, a kneading zone and a die zone. More preferably, a specific temperature profile is maintained along the screw of the melt-mixing device, having an initial temperature T1 in the feed zone, a maximum temperature T2 in the kneading zone and a final temperature T3 in the die zone, all temperatures being defined as barrel temperatures. Barrel temperature T1 (in the feed zone) is preferably in the range of 180 to 260° C. Barrel temperature T2 (in the kneading zone) is preferably in the range of 260 to 300° C. Barrel temperature T3 (in the die zone) is preferably in the range of 220 to 280° C. The screw speed of the melt mixing device can be adjusted depending on the material characteristics. The man skilled in the art is well familiar with this and can easily determine the appropriate screw speed. Generally the screw speed is adjusted to a range from 100 to 750 rotations per minute (rpm), preferably to a range from 150 to 650 rotations per minute (rpm). Following the melt-mixing step, the resulting long-chain branched propylene homopolymer or copolymer (b-PP) melt is generally pelletized, for example in an underwater pelletizer or after solidification of one or more strands in a water bath, in a strand pelletizer.

The long-chain branched polypropylene composition (b-PPC) according to the present invention generally has a F30 melt strength of ≥10 cN as measured according to ISO 16790:2005 at a die pressure of 30 bar. Preferably the F30 melt strength of the long-chain branched polypropylene composition (b-PPC) is in the range of 10.0 to 40.0 cN, preferably in the range of 12.0 to 38.0 cN, more preferably in the range of 14.0 to 36.0 cN. A suitable lower limit is 10.0 cN, preferably 12.0 cN, more preferably 14.0 cN. A suitable upper limit is 40.0 cN, preferably 38.0 cN, more preferably 36.0 cN. The lower and upper indicated values of the F30 melt strength ranges are included.

The long-chain branched polypropylene composition (b-PPC) according to the present invention may have a v30 melt extensibility measured according to ISO 16790:2005, of ≥180 mm/s, preferably in the range of 180 to 500 mm/s, more preferably in the range of 200 to 400 mm/s, like in the range of 220 to 350 mm/s. A suitable lower limit is 180 mm/s, preferably 200 mm/s, more preferably 220 mm/s. A suitable upper limit is 500 mm/s, preferably 400 mm/s, more preferably 350 mm/s. The lower and upper indicated values of the v30 melt extensibility ranges are included.

The long-chain branched polypropylene composition (b-PPC) according to the present invention generally comprises 10.0 to 50.0 wt % of the at least one linear propylene homopolymer or copolymer (l-PP), preferably 15.0 to 45.0 wt %, more preferably 18.0 to 42.0 wt %. Such percentage relative to the total amount of long-chain branched polypropylene composition (b-PPC).

The long-chain branched polypropylene composition (b-PPC) according to the present invention generally comprises at least one or more compounds chosen from additives or polymers other than the at least one long-chain branched propylene homopolymer or copolymer (b-PP) and the at least one linear propylene homopolymer or copolymer (l-PP).

Illustrative additives to be used in the long-chain branched polypropylene composition (b-PPC) according to the present invention include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example talc, benzoates, phosphorous-based compounds, sorbitoles, nonitol-based compounds or amide-based compounds), as well as slip and antiblocking agents (for example erucamide, oleamide, talc, natural silica and synthetic silica or zeolites) and mixtures thereof.

Examples of polymers other than the at least one long-chain branched propylene homopolymer or copolymer (b-PP) and the at least one linear propylene homopolymer or copolymer (l-PP) to be used in the long-chain branched polypropylene composition (b-PPC) according to the present invention include, but are not limited to, carrier polymers of additive(s) in a well-known master-batch, in case the additive is present in the inventive composition in form of a master-batch. Such carrier polymers are preferably polyethylene homopolymers or copolymers like high density polyethylene (HDPE), low density polyethylene (LDPE) or linear low density polyethylene (LLDPE).

Further examples of polymers other than the at least one long-chain branched propylene homopolymer or copolymer (b-PP) and the at least one linear propylene homopolymer or copolymer (l-PP) to be used in the long-chain branched polypropylene composition (b-PPC) according to the present invention include impact modifiers commonly applied for polypropylene. Such impact modifiers include, but are not limited to, ethylene-propylene rubbers (EPR), ethylene-propylene-diene elastomers (EPDM), polyethylene elastomers and plastomers (POE, POP), olefin block copolymers (OBC) and styrene elastomers like styrene-ethylene/butylene-styrene (SEBS) block copolymers. Preferred impact modifiers are polyethylene elastomers (POE), like ethylene-alpha olefin elastomers being copolymers of ethylene and a $C_3$-$C_{10}$ alpha-olefin and having a density in the range of 0.860 to 0.915 g/cm$^3$.

Generally the total amount of additives and/or polymers other than the at least one long-chain branched propylene homopolymer or copolymer (b-PP) and the at least one linear propylene homopolymer or copolymer (l-PP) comprised in the long-chain branched polypropylene composition (b-PPC) is of not more than 10.0 wt %, preferably in an amount of not more than 5.0 wt %, more preferably in an amount of not more than 3.0 wt %, even more preferably in an amount of not more than 1.5 wt % relative to the total weight of the long-chain branched polypropylene composition (b-PPC) according to the invention.

The long-chain branched polypropylene composition (b-PPC) according to the present invention generally has a xylene hot insoluble (XHU) fraction of <0.5 wt %, as measure according to EN 579. Preferably the xylene hot insoluble (XHU) fraction of the long-chain branched polypropylene composition (b-PPC) according to the present invention is in the range of 0.0 to 0.4 wt %, more preferably in the range of 0.0 to 0.3 wt %. The lower and upper indicated values of the xylene hot insoluble (XHU) fraction ranges are included.

The present invention is further concerned with a process for producing a long-chain branched polypropylene composition (b-PPC) according to the invention, characterized in that the at least one long-chain branched propylene homopolymer or copolymer (b-PP) and the at least one linear propylene homopolymer or copolymer (l-PP) are mixed with at least one or more compounds chosen from:
a) additives,
b) polymers other than the at least one long-chain branched propylene homopolymer or copolymer (b-PP) and the at least one linear propylene homopolymer or copolymer (l-PP) and
c) fillers provided that the relative amount of (c) does not exceed 15.0 wt %, relative to the total weight of the long-chain branched polypropylene composition (b-PPC) according to the invention.

For the types of additives and polymers other than the at least one long-chain branched propylene homopolymer or copolymer (b-PP) and the at least one linear propylene homopolymer or copolymer (l-PP) used for producing the long-chain branched polypropylene composition according to the invention, reference is made to what has been previously described.

Illustrative fillers to be used in the long-chain branched polypropylene composition (b-PPC) according to the invention are:
a) minerals like talc, calcium carbonate and kaolin clay or
b) organic components like cellulose fibres, cellulose powder and starch powder or
c) mixtures of (a) and (b).

Generally the total amount of fillers in the long-chain branched polypropylene composition (b-PPC) is of not more than 15.0 wt %, preferably in an amount of not more than 10.0 wt %, more preferably in an amount of not more than 5.0 wt % relative to the total weight of the long-chain branched polypropylene composition (b-PPC) according to the invention.

The long-chain branched polypropylene composition (b-PPC) according to the present invention is generally prepared using any of the methods known by the man skilled in the art. Illustrative examples of the long-chain branched polypropylene composition (b-PPC) preparation are:
a) a dry-blending process involving the mixing of the at least one long-chain branched propylene homopolymer or copolymer (b-PP) with the at least one linear propylene homopolymer or copolymer (l-PP) in the desired weight percent using a batch dry-blending device and
b) a melt-mixing process involving the mixing of the at least one long-chain branched propylene homopolymer or copolymer (b-PP) with the at least one linear propylene homopolymer or copolymer (l-PP) in the desired weight percent using a batch or a continuous melt-mixing device.

Examples of typical batch melt-mixing devices are the Banbury and the heated roll mill. The melt-mixing process is generally carried out at a barrel temperature in the range of 180 to 300° C., which is not necessarily constant over the complete melt-mixing process. The barrel temperature is preferably in the range of 200 to 280° C. The melt-mixing process involving the mixing of the at least one long-chain branched propylene homopolymer or copolymer (b-PP) with the at least one linear propylene homopolymer or copolymer (l-PP) for the preparation of the long-chain branched polypropylene composition (b-PPC) according to the invention is preferably carried out in a continuous melt-mixing device like for example a single screw extruder, a co-rotating twin screw extruder or a co-rotating kneader. More preferably, the melt mixing device includes a feed zone, a kneading zone and a die zone. Even more preferably, a specific temperature profile is maintained along the screw of the melt-mixing device, having an initial temperature T1 in the feed zone, a temperature T2 in the kneading zone and a final temperature T3 in the die zone, all temperatures being defined as barrel temperatures. Barrel temperature T1 (in the feed zone) is preferably in the range of 180 to 240° C. Barrel temperature T2 (in the kneading zone) is preferably in the range of 240 to 300° C. Barrel temperature T3 (in the die zone) is preferably in the range of 240 to 280° C. The screw speed of the melt-mixing device can be adjusted depending on the material characteristics. The man skilled in the art is well familiar with this and can easily determine the appropriate screw speed. Generally the screw speed is adjusted to a range from 100 to 750 rotations per minute (rpm), preferably to a range from 150 to 650 rotations per minute (rpm). Following the melt-mixing process, the resulting long-chain branched polypropylene composition (b-PPC) melt is generally pelletized, for example in an underwater pelletizer or after solidification of one or more strands in a water bath, in a strand pelletizer.

The invention also provides an article made from a long-chain branched polypropylene composition (b-PPC) according to the invention.

Suitable articles made from a long-chain branched polypropylene composition (b-PPC) according to the present invention are for example toys, grips, handles, floorings, wheels, furniture and appliance feet, hoses, office supplies, tubes, lids, cups, kitchen wares, pipes, fibres, tapes or foams. A preferred article made from a long-chain branched polypropylene composition (b-PPC) according to the present invention is a foam or foamed article.

The invention also provides an article, preferably a foam or foamed article, made at least in part from:
a) a recyclate created during the process, according to the invention, for producing the long-chain branched polypropylene composition according to the invention,
b) a recyclate created during the production of fresh prepared articles or intermediates made from the long-chain branched polypropylene composition according to the invention,
c) a recyclate from post-consumer articles made from the long-chain branched polypropylene composition according to the invention and/or
d) a material from ready-made articles made from the long-chain branched polypropylene composition according to the invention.

For the type of article reference is made to what has been previously described. For the purpose of the present description and of the subsequent claims, the term "recyclate" is used to indicate the material recovered from both post-consumer waste and industrial waste. Namely, post-consumer waste refers to objects and articles having completed at least a first use cycle (or life cycle), i.e. having already served their first purpose; while industrial waste refers to manufacturing scrap created during the production of articles which normally will not have reached a consumer.

The invention also provides a process for producing an article according to the invention comprising the steps of:
a) introducing into an extruder at least one of:
   i. the long-chain branched polypropylene composition (b-PPC) according to the invention,
   ii. the recyclate created during the process, according to the invention, for producing the long-chain branched polypropylene composition according to the invention,
   iii. the recyclate created during the production of fresh prepared articles or intermediates made from the long-chain branched polypropylene composition according to the invention,
   iv. the recyclate from post-consumer articles made from the long-chain branched polypropylene composition according to the invention
and
   v. the material from ready-made articles made from the long-chain branched polypropylene composition according to the invention,
b) melt-mixing the components mentioned in step (a) in the extruder thereby forming a molten material,
c) introducing the molten material to a mould or to an extrusion die,
d) delivering a moulded or extruded article at the end of the process.

The invention also provides a foam or a foamed article comprising the long-chain branched polypropylene composition (b-PPC) according to the invention. Preferably the foam comprises at least 70.0 wt %, more preferably at least 80.0 wt %, most preferably at least 90.0 wt %, still most preferably at least 95.0 wt %, of the long-chain branched polypropylene composition (b-PPC) according to the invention. The above given weight percent (wt %) is relative to the total amount of thermoplastic material comprised in the foam. In a preferred embodiment the foam consists of the long-chain branched polypropylene composition (b-PPC) according to the invention.

Generally the foam has a density of at most 300 $kg/m^3$. Preferably the foam has a density in the range of 60 to 300 $kg/m^3$, more preferably the foam has a density in the range of 70 to 280 $kg/m^3$, even more preferably the foam has a density in the range of 80 to 260 $kg/m^3$.

The invention also provides a process for producing a foam according to the invention comprising the steps of:
a) introducing into an extruder the long-chain branched polypropylene composition (b-PPC) according to the invention,
b) introducing a foaming agent into the extruder,
c) melt-mixing the long-chain branched polypropylene composition (b-PPC) according to the invention, in the extruder in order to form a molten material,
d) discharging the molten material through a die thereby foaming the molten material.

Foaming can be accomplished by chemical and/or physical foaming agents. Appropriate foaming lines are state of the art and described, for example, in S.-T. Lee (edit.), Foam Extrusion Principles and Practice, CRC Press (2000).

Furthermore, the present invention also relates to a process for the preparation of the foam as defined above, wherein the long-chain branched polypropylene composition (b-PPC) according to the invention is subjected to foaming to achieve a foam density from 60.0 to 300 $kg/m^3$. In such a process, a melt of the long-chain branched polypropylene composition (b-PPC) according to the invention and a chemical and/or a physical foaming agent are mixed in an extruder. Gaseous foaming agents such as butane, partially fluorinated hydrocarbons (HFC) or $CO_2$ are generally expanded through a pressure drop. Continuous foaming processes as well as discontinuous processes may be applied.

In a continuous foaming process, a polymer is melted and loaded with gas in an extruder under pressures typically above 20.0 bar before being extruded through a die where the pressure drop over the die causes the formation of a foam. The mechanism of foaming polypropylene in foam extrusion is explained, for example, in H. E. Naguib, C. B. Park, N. Reichelt, "Fundamental foaming mechanisms governing the volume expansion of extruded polypropylene foams, Journal of Applied Polymer Science, 91, 2661-2668 (2004).

In a discontinuous foaming process, polymer (micro-) pellets are loaded with foaming agent under pressure and heated below melting temperature before the pressure in an autoclave is suddenly relaxed. The dissolved foaming agent forms bubbles and creates a foam structure. Such a discontinuous preparation of foamed beads is described for example in DE 3 539 352.

Finally the present invention is also directed to the use of the long-chain branched polypropylene composition (b-PPC) according to the invention for producing an extruded foam and/or an extrusion foam article.

EXAMPLES

The following definitions of terms and determination methods apply for the above general description of the invention as well as to the below examples unless otherwise defined.

I—Measuring Methods a) Comonomer Content

Quantitative nuclear-magnetic resonance (NMR) spectroscopy was used to quantify the comonomer content and comonomer sequence distribution of the polymers. Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and was quantitatively needed for accurate ethylene content quantification. Standard single-pulse excitation was employed without Nuclear Overhauser Effect (NOE), using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C$ $\{^1H\}$ NMR spectra were processed, integrated and relevant quantitative properties determined from the integrals using computer programs. All chemical shifts were indirectly referenced to the central methylene group of the ethylene block (EEE) at 30.00 ppm using the chemical shift of the solvent. This approach allowed comparable referencing, even when this structural unit was not present. Characteristic signals corresponding to the incorporation of ethylene were observed as described in Cheng, H. N., Macromolecules 17 (1984), 1950). With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33, 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to be present. This approach reduced the overestimation of ethylene content for such systems and was achieved by reduction of the number of sites used to determine the absolute ethylene content to:

$$E=0.5(S_{\beta\beta}+S_{\beta\gamma}+S_{\beta\delta}+0.5(S_{\alpha\beta}+S_{\alpha\gamma}))$$

Through the use of this set of sites the corresponding integral equation becomes:

$$E=0.5(I_H+I_G+0.5(I_C+I_D))$$

using the same notation as used in the article of Wang et. al. (Wang, W.-J., Zhu, S., Macromolecules 33 (2000), 1157). Equations used for absolute propylene content were not modified. The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (I)):

$$I(E) = \frac{fPEP}{(fEEE + fPEE + fPEP)} \times 100 \quad (I)$$

wherein

I(E) is the relative content of isolated to block ethylene sequences [in %];

fPEP is the mole fraction of propylene/ethylene/propylene sequences (PEP) in the sample;

fPEE is the mole fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample.

b) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

c) F30 Melt Strength and V30 Melt Extensibility

The test described herein follows ISO 16790:2005. An apparatus according to FIG. 1 of ISO 16790:2005 is used.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr. 2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). For measuring F30 melt strength and v30 melt extensibility, the pressure at the extruder exit (=gear pump entry) is set to 30 bars by by-passing a part of the extruded polymer. In an analogous way, for measuring F200 melt strength and v200 melt extensibility, the pressure at the extruder exit (=gear pump entry) is set to 200 bars.

The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero). Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed), where the polymer strand ruptures, are taken as the F30 melt strength and v30 melt extensibility values respectively or as the F200 melt strength and v200 melt extensibility values depending on the measurement.

II—Inventive and Comparative Examples a) Inventive Examples, Dry-Blended Compounds The inventive long-chain branched polypropylene compositions (IE1, IE2, IE3 and IE4) were prepared by adding the corresponding amounts of b-PP and l-PP-1 or l-PP-2 in the form of pellets into a tumbling device. The resulting pellet mixtures were tested without further heating prior to the test.

b-PP is a long-chain branched propylene homopolymer grade WB140HMS commercialized by Borealis, having an $MFR_2$ of 2.1 g/10 min and a melting temperature of 165° C.

l-PP-1 is a linear propylene homopolymer grade BE50 commercialized by Borealis, having an $MFR_2$ of 0.30 g/10 min and a melting temperature of 165° C.

l-PP21 is a linear heterophasic propylene copolymer grade BA212E commercialized by Borealis, having an $MFR_2$ of 0.3 g/10 min, a melting temperature of 165° C. and an ethylene content of 4.6 wt %.

b) Inventive Examples, Compounded

The inventive long-chain branched polypropylene compositions (IE1-A, IE2-A, IE3-A and IE4-A) were prepared by melt-mixing the corresponding amounts of b-PP and l-PP-1 or l-PP-2 in a Coperion ZSK 32MC twin-screw extruder at a melt temperature of 260° C. using a screw speed of 220 rpm and an extruder throughput of 75 kg/h.

The temperature profile was set as follow: 230-240-250-260° C.

c) Comparative Example

The comparative example (CE1) is the b-PP long-chain branched propylene homopolymer grade WB140HMS commercialized by Borealis and having an $MFR_2$ of 2.1 g/10 min.

d) Comparative Example, Compounded

The comparative example CE1-A was prepared by extruding the corresponding amount of b-PP in a Coperion ZSK 32MC twin-screw extruder at a melt temperature of 260° C. using a screw speed of 220 rpm and an extruder throughput of 75 kg/h.

The temperature profile was set as follow: 230-240-250-260° C.

TABLE 1

Characterization of inventive long-chain branched polypropylene compositions (IE1, IE2, IE3, IE4, IE1-A, IE2-A, IE3-A and IE4-A) and comparative examples (CE1 and CE1-A)

|   | CE1* | IE1** | IE2** | IE3** | IE4** | CE1-A*** | IE-A*** | IE2-A*** | IE3-A*** | IE4-A*** |
|---|---|---|---|---|---|---|---|---|---|---|
| b-PP (wt %) | 100 | 80.0 | 60.0 | 80.0 | 60.0 | 100 | 80.0 | 60.0 | 80.0 | 60.0 |
| l-PP-1 (wt %) | 0.0 | 20.0 | 40.0 | 0.0 | 0.0 | 0.0 | 20.0 | 40.0 | 0.0 | 0.0 |
| l-PP-2 (wt %) | 0.0 | 0.0 | 0.0 | 20.0 | 40.0 | 0.0 | 0.0 | 0.0 | 20.0 | 40.0 |
| F30 (cN) | 36.0 | 33.0 | 42.0 | 42.0 | 42.0 | 8.0 | 19.0 | 35.0 | 12.3 | 22.0 |
| v30 (mm/s) | 255 | 240 | 232 | 249 | 233 | 272 | 241 | 231 | 249 | 227 |

*as produced,
**dry-blended,
***compounded

From Table 1 it can be derived that the thy-blended long-chain branched polypropylene compositions according to the invention (IE1, IE2, IE3 and IE4) present higher or similar melt strength (F30) than the comparative example (CE1). It can also be derived that the inventive examples prepared by melt-mixing compounding in an extruder (IE1-A, IE2-A, IE3-A and IE4-A) are capable of withstanding shear and elongation during processing and keeping good melt strength properties after been processed, compared to the comparative example CE1-A. This enables the direct reuse of recyclates created during the long-chain branched polypropylene composition preparation, according to the invention, and also during the production of articles made of such long-chain branched polypropylene composition. It also enables the recycling of ready-made and post-consumer articles made from such long-chain branched polypropylene composition.

The invention claimed is:

1. Long-chain branched polypropylene composition (b-PPC) comprising:
   a) at least one long-chain branched propylene homopolymer or copolymer (b-PP) having:
      i. a melt flow rate MFR2 in the range of 1.5 to 3.5 g/10 min as measured at 230° C. under a load of 2.16 kg according to ISO 1133, and
      ii. a F30 melt strength in the range of 10.0 to 40.0 cN as measured at a die pressure of 30 bar according to ISO 16790:2005,
   b) at least one linear propylene homopolymer or copolymer (l-PP) having:
      i. a melt flow rate MFR2 of 1.5 g/10 min as measured at 230° C. under a load of 2.16 kg according to ISO 1133, and
      ii. a F30 melt strength >40.0 cN as measured at a die pressure of 30 bar according to ISO 16790:2005,
   wherein the long-chain branched polypropylene composition (b-PPC) has a F30 melt strength of 10.0 cN as measured at a die pressure of 30 bar according to ISO 16790:2005 and wherein the long-chain branched polypropylene composition (b-PPC) comprises 18.0 to 50.0 wt % of the at least one linear propylene homopolymer or copolymer (l-PP), relative to the total amount of long-chain branched polypropylene composition (b-PPC).

2. Long-chain branched polypropylene composition (b-PPC) according to claim 1, wherein the long-chain branched polypropylene composition (b-PPC) has a v30 melt extensibility of 180 mm/s as measured at a die pressure of 30 bar according to ISO 16790:2005.

3. Long-chain branched polypropylene composition (b-PPC) according to claim 1, wherein,
   a) the at least one long-chain branched propylene copolymer (b-PP) has a comonomer selected from ethylene, $C_4$-$C_{20}$-alpha olefin and any combination thereof and a comonomer content in the range of 0.5 to 8.0 wt % or
   b) the at least one long-chain branched propylene homopolymer (b-PP) is essentially free of a comonomer meaning, that it has a comonomer content of 0.5 wt % or less.

4. Long-chain branched polypropylene composition (b-PPC) according to claim 1, wherein:
   a) the at least one linear propylene copolymer (l-PP) has a comonomer selected from ethylene, $C_4$-$C_{20}$-alpha olefin and any combination thereof and a comonomer content in the range of 2.0 to 35.0 wt % or
   b) the at least one linear propylene homopolymer (l-PP) has a weight average molecular weight (Mw) of at least 750 kg/mol and is essentially free of a comonomer meaning, that it has a comonomer content of 0.5 wt % or less.

5. Long-chain branched polypropylene composition (b-PPC) according to claim 1, wherein the long-chain branched polypropylene composition (b-PPC) comprises 18.0 to 45.0 wt % of the at least one linear propylene homopolymer or copolymer, relative to the total amount of long-chain branched polypropylene composition (b-PPC).

6. Long-chain branched polypropylene composition (b-PPC) according to claim 1, wherein the long-chain branched polypropylene composition (b-PPC) comprises at least one or more compounds chosen from additives and polymers other than the at least one long-chain branched propylene homopolymer or copolymer (b-PP) and the at least one linear propylene homopolymer or copolymer (l-PP).

7. Long-chain branched polypropylene composition (b-PPC) according to claim 1, wherein:
   a) the least one long-chain branched propylene copolymer (b-PP) is a random copolymer having a single-phase structure, and/or
   b) the least one linear propylene copolymer (l-PP) is a heterophasic copolymer.

8. A process for producing a long-chain branched polypropylene composition (b-PPC) according to claim 1, wherein the at least one long-chain branched propylene homopolymer or copolymer (b-PP) and the at least one linear propylene homopolymer or copolymer (l-PP) are mixed with at least one or more compounds chosen from:
   a) additives,
   b) polymers other than the at least one long-chain branched propylene homopolymer or copolymer (b-PP) and the at least one linear propylene homopolymer or copolymer (l-PP) and
   c) fillers provided that the relative amount of (c) does not exceed 15.0 wt %, relative to the total weight of the long-chain branched polypropylene composition (b-PPC) according to the invention.

9. A process according to claim 8, wherein the polymer other than the at least one long-chain branched propylene homopolymer or copolymer (b-PP) and the at least one linear propylene homopolymer or copolymer (l-PP) is an impact modifier.

10. An article made from a long-chain branched polypropylene composition (b-PPC) according to claim 1.

* * * * *